(12) United States Patent  (10) Patent No.: US 8,090,370 B2
Choi et al.  (45) Date of Patent: Jan. 3, 2012

(54) COMBINED BASE TRANSCEIVER STATION AND BASE STATION CONTROLLER OPTIMIZED ASSIGNMENT OF FRAME OFFSETS

(75) Inventors: Myoung Chul Choi, Plano, TX (US); Jae Hong Park, Plano, TX (US); Hyunyung Cha, Plano, TX (US)

(73) Assignee: Airwalk Communications, Inc., Richardson, TX (US)

( * ) Notice: Subject to any disclaimer, the term of this patent is extended or adjusted under 35 U.S.C. 154(b) by 990 days.

(21) Appl. No.: 11/037,388

(22) Filed: Jan. 18, 2005

(65) Prior Publication Data

US 2005/0188195 A1  Aug. 25, 2005

Related U.S. Application Data

(60) Provisional application No. 60/537,408, filed on Jan. 16, 2004, provisional application No. 60/537,419, filed on Jan. 16, 2004.

(51) Int. Cl.
*H04W 4/00* (2009.01)

(52) U.S. Cl. ............. 455/435.1; 455/433; 455/436; 455/458; 455/435.2; 370/331; 370/328; 370/335; 370/466; 709/202; 709/213; 379/201.01; 379/207.02; 379/265.02

(58) Field of Classification Search ............ 455/435.1, 455/433, 458, 436, 413, 414.1, 453; 370/331, 370/328, 335, 466; 709/202, 213; 714/4; 379/201.01, 207.02, 265.02
See application file for complete search history.

(56) References Cited

U.S. PATENT DOCUMENTS

| | | | | |
|---|---|---|---|---|
| 6,058,303 A | * | 5/2000 | .ANG.strom et al. | 455/413 |
| 6,065,040 A | * | 5/2000 | Mima et al. | 709/202 |
| 6,389,283 B1 | * | 5/2002 | Sanchez Herrero | 455/433 |
| 6,490,259 B1 | * | 12/2002 | Agrawal et al. | 370/331 |
| 6,622,016 B1 | * | 9/2003 | Sladek et al. | 455/414.1 |
| 6,687,495 B2 | * | 2/2004 | Bhatia et al. | 455/414.1 |
| 6,847,991 B1 | * | 1/2005 | Kurapati | 709/213 |
| 6,885,668 B1 | | 4/2005 | Lee et al. | |
| 6,888,937 B1 | * | 5/2005 | Kurapati | 379/265.02 |
| 7,006,479 B1 | * | 2/2006 | Joo et al. | 370/338 |
| 7,007,190 B1 | * | 2/2006 | Kurapati et al. | 714/4 |
| 7,042,995 B1 | * | 5/2006 | Praturi et al. | 379/207.02 |
| 7,043,253 B2 | * | 5/2006 | Madour et al. | 455/453 |
| 7,058,082 B1 | * | 6/2006 | Bhat et al. | 370/466 |
| 7,076,042 B1 | * | 7/2006 | Praturi et al. | 379/201.01 |
| 7,120,133 B1 | * | 10/2006 | Joo et al. | 370/328 |
| 7,120,453 B2 | * | 10/2006 | La Porta et al. | 455/458 |
| 7,133,672 B2 | | 11/2006 | Sayeedi | |
| 7,151,758 B2 | * | 12/2006 | Kumaki et al. | 370/331 |
| 7,299,052 B2 | | 11/2007 | Ji et al. | |
| 7,320,017 B1 | * | 1/2008 | Kurapati et al. | 709/202 |
| 7,483,410 B1 | * | 1/2009 | Joo et al. | 370/335 |
| 2002/0085532 A1 | * | 7/2002 | Kim | 370/338 |
| 2003/0032451 A1 | * | 2/2003 | Hu | 455/560 |
| 2003/0119519 A1 | | 6/2003 | Madour et al. | |
| 2003/0223393 A1 | * | 12/2003 | Lee | 370/335 |
| 2004/0001474 A1 | * | 1/2004 | Simelius et al. | 370/349 |

(Continued)

*Primary Examiner* — Temesgh Ghebretinsae
*Assistant Examiner* — April G Gonzales

(57) ABSTRACT

A system, method, and computer readable medium for managing an availability of a call agent, comprising acquiring a session identification by a basestation (BS) and a call agent (CA), wherein the BS is coupled to the CA, if the CA's state is changed from an active state to a standby state, requesting a new connection with the BS; and after the new connection is established between the CA and the BS, sending another session identification from the CA to the BS.

15 Claims, 7 Drawing Sheets

U.S. PATENT DOCUMENTS

| | | |
|---|---|---|
| 2004/0110512 A1 | 6/2004 | Lim |
| 2004/0203957 A1 | 10/2004 | George |
| 2006/0094450 A1* | 5/2006 | Park et al. ............... 455/458 |
| 2006/0227717 A1* | 10/2006 | van den Berg et al. ....... 370/252 |
| 2007/0086359 A1* | 4/2007 | Yaqub ............... 370/254 |
| 2007/0178876 A1* | 8/2007 | Yaqub et al. ............ 455/343.1 |
| 2010/0061226 A1* | 3/2010 | Morishige et al. .......... 370/216 |

* cited by examiner

500 ↓

| Bytes | Description |
|---|---|
| 1 | Length |
| 2 | Message Type |
| 3 | Local Session ID |
| 4 | |
| 5 | |
| 6 | |

FIG. 7

COMBINED BASE TRANSCEIVER STATION AND BASE STATION CONTROLLER OPTIMIZED ASSIGNMENT OF FRAME OFFSETS

CROSS REFERENCE TO RELATED APPLICATIONS

The present patent application is related to and claims the benefit of provisional patent application No. 60/537,408, filed on Jan. 16, 2004, entitled CDMA Radio Access Network System and Method, and provisional patent application No. 60/537,419, filed on Jan. 16, 2004, entitled CDMA IP Base Transceiver Station, the contents of which are enclosed by reference herein. The present patent application is further related to patent application docket number AW0012005 entitled Combined Base Transceiver Station and Base Station Controller, patent application docket number AW0022005 entitled Combined Base Transceiver Station and Base Station Controller Call Origination And Termination, patent application docket number AW0032005 entitled Combined Base Transceiver Station and Base Station Controller Handoff, patent application docket number AW0042005 entitled Combined Base Transceiver Station and Base Station Controller Data Call, and patent application docket number AW0052005 entitled Combined Base Transceiver Station and Base Station Controller Data Call And Quality Of Service, each of which is assigned to the assignee of the present invention and is filed on even date herewith.

BACKGROUND OF THE INVENTION

The present invention is related to a base transceiver station and a base station controller, and, more specifically to a combined base transceiver station and a base station controller.

Current cellular operators predominantly provide services via very large or macro coverage areas. Limitations encountered by these operators include the difficulty of providing reliable in-building or campus coverage. Such coverage should provide subscribers with seamless services at a particular quality level, and should provide operators with additional revenue sources.

Therefore, what is needed is a wireless solution that overcomes the aforementioned limitations by providing a micro solution that compliments the wireless macro network by providing increased voice and data capacity and coverage.

SUMMARY OF THE INVENTION

The present invention provides a radio access network (RAN) system (which contains a base transceiver station and a base station controller integrated into a single compact platform) for wireless coverage and in-building services, as well as for providing additional capacity in a macro network when it comes to filling "hotspots." Such a RAN system, which preferably operates in or in conjunction with a CDMA network, supports signaling, traffic, handoff, power, and control, while providing multiple interfaces to the core network.

In one embodiment, a method for managing an availability of a call agent, comprises acquiring a session identification by a basestation (BS) and a call agent (CA), wherein the BS is coupled to the CA, if the CA's state is changed from an active state to a standby state, requesting a new connection with the BS; and after the new connection is established between the CA and the BS, sending another session identification from the CA to the BS.

In another embodiment, a system for managing an availability of a call agent comprises acquiring a first identification by a first module and a second module, wherein the first module is coupled to the second module, if the second module's state is changed, requesting a new connection with the first module, and after the new connection is established between the second module and the first module, sending a second session identification from the second module to the first module, wherein the second session identification is equivalent to the first session identification.

In a further embodiment, a computer readable medium comprises instructions for: acquiring a first identification by a first module and a second module, wherein the first module is coupled to the second module, if the second module's state is changed, requesting a new connection with the first module, and sending a second session identification from the second module to the first module via the new connection, wherein the second session identification is equivalent to the first session identification.

BRIEF DESCRIPTION OF THE DRAWINGS

FIG. 7 depicts a session control procedure in accordance with a preferred embodiment of the present invention.

DETAILED DESCRIPTION OF THE INVENTION

Figure 1:
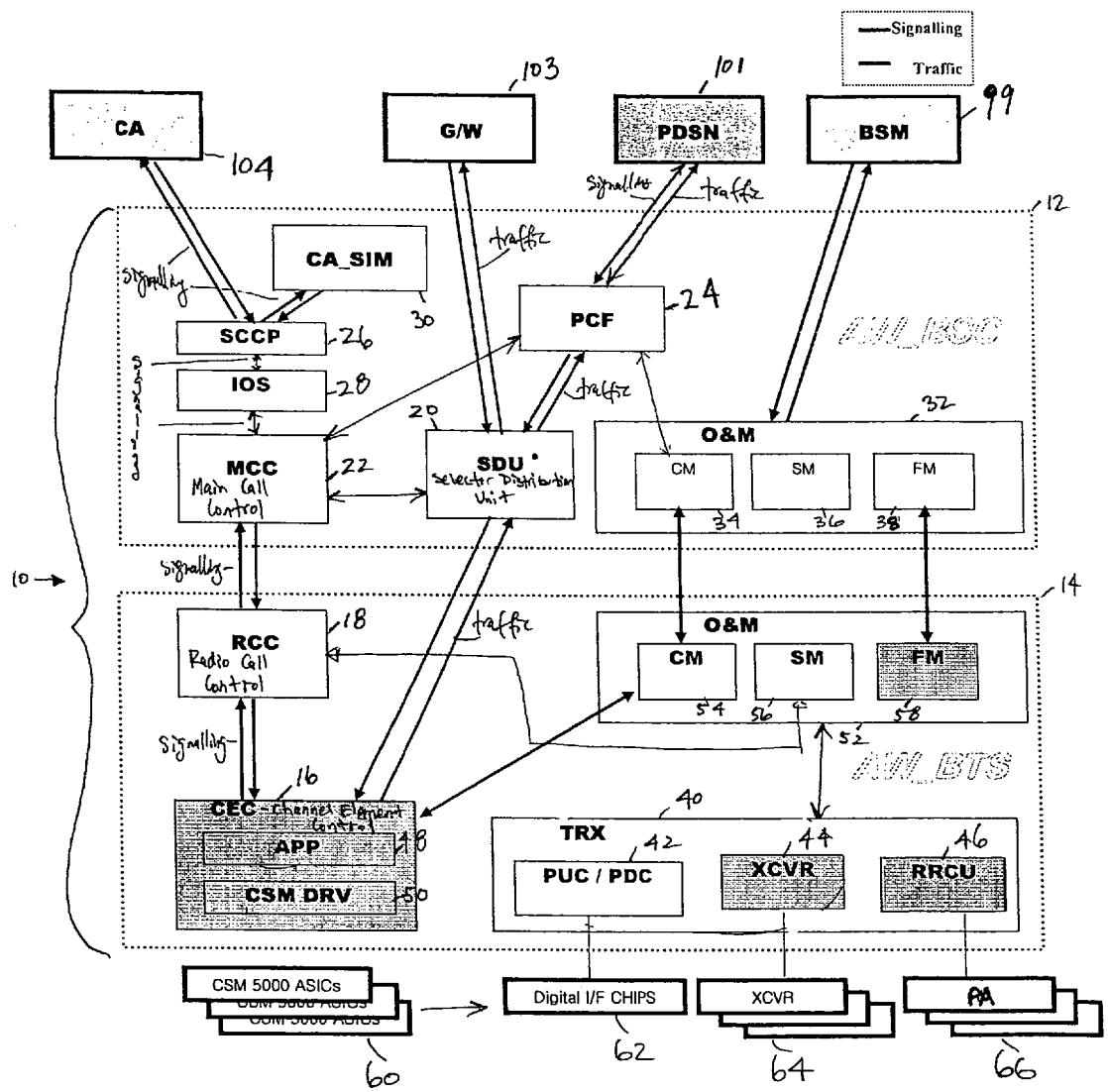
FIG. 1 depicts a radio access network (RAN) in accordance with a preferred embodiment of the present invention.

Referring now to FIG. 1, radio access network (RAN) 10 comprises a base station controller (BSC) 12 and a base transceiver station (BTS) 14 that comprise a number of blocks or modules. These blocks or modules are software, hardware, firmware, and/or a combination of software, hardware, and/or firmware. The BSC 12 comprises a selector distribution unit (SDU) 20 coupled to a main call control (MCC) 22 and to a packet control function (PCF) 24 which is also coupled to the MCC 22, a signaling control connection part (SCCP) 26 coupled to an interoperability system (IOS) 28 which is also coupled to the MCC 22, a call agent simulator (CA_SIM) 30 which is coupled to the SCCP 26, and an operation, administration, and maintenance (OA&M) 32 module coupled to the PCF 24.

Main Call Control (MCC) 22

The MCC 22, which performs the operations that pertain to individual subscribers including registration, call setup, call release, handoff and other subscriber features, is associated with the following functionality:

Registration—Mobile registration is a process where mobile characteristics such as location or status are provided to the network. Registration may be initiated by a mobile station (MS, not shown), by a network, or implied during access by the MS. To support these features, the MCC 22 interfaces with a radio call control module (RCC) 18, which will be described further below, and with a call agent (CA) 104. The CA 104 is preferably a soft switch whose functions include call processing, supplementary service, registration, interacts with a Home Location Register (HLR) in the macro network, and provides common PBX functions.

Mobile Originated Call Setup for Voice and Circuit Data Calls—The MCC 22 receives an Origination Message from the MS via the RCC 18 and then communicates with CA 104 to request call service, confirm the validity of the MS, as well as get the resource information from a media gateway (MG, not shown). The MG mediates the elements between circuit switched voice networks and an IP network. For example, the MG relays voice, fax, modem and data traffic over the IP network. The MCC 22 interfaces with the RCC 18 to request a radio resource and with the SDU 20 to allocate a selector resource.

Mobile Terminated Call Setup for Voice and Calls and Circuit Data Call—The MCC 22 receives a Paging Request message from the CA 104 and passes it to the RCC 18 to initiate a mobile terminated call setup scenario. The MCC 22 receives a Page Response Message then communicates with the CA 104 to get the resource information from the MG and indicate for the call to be answered at the MS. The MCC 22 interfaces with the RCC 18 to request a radio resource and with the SDU 20 to allocate a selector resource.

Call Clearing of Voice and Circuit Data Calls—Call clearing may be initiated by either the MS, the SDU 20 or the CA 104. The MCC 22 sends clear messages to the SDU 20 or to the CA 104 and releases internal resources.

Mobile Originated Call Setup for Packet Data Calls

The MCC 22 receives an Origination Message from the MS via the RCC 18 with a data rate to send set to 'true' (DRS=1) and a packet data service option, and then communicates with the CA 104 to request packet data service and confirm the validity of the MS. The MCC 22 interfaces with the PCF 24 to setup a connection to a packet data serving node (PDSN) 101, which exchanges packets with the MS over the radio and the other IP networks, with the RCC 18 to requests a radio resource, and with the SDU 20 to allocate a selector resource.

Reactivation of Packet Data Calls

The MCC 22 supports either the MS initiated or network initiated reactivation from a dormant state. With a MS initiated reactivation, a normal packet data call setup procedure in the MCC ensues, while with a network initiated reactivation, the MCC 22 sends a base station (BS, not shown) Service Request to the CA 104 to begin an initiated call setup as a request from the PCF 24. The BS, which is a fixed station that communicates with the MS, may be a cell, a sector within a cell, a mobile switching center (MSC), or other part of the wireless system.

Call Clearing of Packet Data Calls

Call clearing may be initiated by either the MS, the SDU 20, the CA 104 or the PCF 24. During a call clearing scenario, the MCC 22 sends clear messages to the SDU 20, the CA 104 and the PCF 24 and releases internal resources.

Transition to Dormancy for Packet Data Calls

If the MS transits to a Dormant State, the MCC 22 proceeds in a normal packet call release scenario and notifies the CA while setting the release cause to "packet call going dormant." The MCC 22 also supports Dormant Handoff.

Short Data Bursts

The MCC 22 supports a Short Data Burst which consists of a small number of frames that are transmitted to a MS with a dormant packet data service instance.

Inter-BS Handoff

The MCC 22 supports soft handoff, inter-frequency assignment (FA) hard handoff and intra-FA hard handoff. The MCC 22 interfaces with the RCC 18 to get radio resources as request from the SDU 20 and manages neighbor lists.

Inter-CA Hard Handoff

When the MCC 22 receives a handoff request message from the SDU 20 and the handoff type is inter-CA hard handoff, the MCC 22 sends a Handoff Required message to the CA 104 to initiate an inter-CA hard handoff as a serving part. If the MCC 22 receives a Handoff Request message from the CA 104, the MCC 22 initiates an inter-CA hard handoff scenario as a target part.

Terminal Authentication

Terminal authentication is the process by which information is exchanged between the MS and the network to confirm the identity of the MS. The MCC 22 delivers relegated messages to the SDU 20, the RCC 18 and the CA 104.

Short Message Service

Short Message Service (SMS) is a mechanism of delivery of short messages over the mobile network. The MCC 22 supports messages and process for SMS mobile originated calls, SMS mobile terminated calls, and SMS Broadcast calls.

Supplementary Services

The MCC 22 supports various supplementary services including Message Waiting, Call Forwarding, Call Delivery, Call Transfer, Three Way Calling, and Conference Calling in terms of communicating with the RCC 18 using a Feature Notification Message or with the SDU 20 using Flash with an Information Message.

Test Calls

The MCC 22 initiates the test call process as a request from the base station manager (BSM 99) or on receiving an Origination Message with a look back service option from the MS.

Call Trace

The MCC 22 initiates the call trace process as a request from the WPM. The MCC 22 stores the related information to a buffer and starts a trace whenever the MS requests call service.

Selector Distribution Unit (SDU) 20

The SDU 20, which includes an air interface portion that processes air messages between the SDU and a MS, a router interface portion that processes messages between the SDU and other software blocks, and a portion that processes voice and data calls, is associated with the following functionality:

Multiplex and De-Multiplex

This function multiplexes and de-multiplexes user traffic and signaling traffic for the air interface.

Forward and Reverse Traffic Frame Selection and Distribution

This function is responsible for selecting the best quality incoming air interface reverse link frame involved in the soft handoff, and distributes forward air interface frames to all channel elements involved in a call.

Handoff Type Decision and Handoff Direction

This function decides a handoff type that will be processed including soft handoff, softer handoff, hard handoff, etc., and directs handoff processing to other software blocks such as the MCC 22 and a traffic channel element (TCE) in the CEC 16.

Process Radio Link Protocol (RLP) Procedures

A RLP Type 1, 2, and 3 is used with IS-95A/B or cdma2000 traffic channels to support CDMA data services. The RLP, which is a connection-oriented, negative-acknowledgement based data delivery protocol, provides an octet stream transport service over forward and reverse traffic channels. The RLP includes procedures to reduce the error rate exhibited by CDMA traffic channels.

Forward and Reverse Power Control

This function generates or utilizes relevant power control information that is exchanged over the air interface or the channel element.

Process Test Call Procedures

This function supports an MS loop-back call, such as a service option 2 and a service option 9 call.

Process Real Time Protocol (RTP) Procedures

This function is responsible for interfacing with a MG or other BSCs.

Process Signaling Layer 2 Procedures

This function performs the layer 2 functionality of the air interface signaling protocol and is responsible for the reliable delivery of the layer 3 signaling messages between the BSC and the MS.

Process Generic Routing Encapsulation (GRE) Procedures

This function is responsible for interfacing with the PDSN 101.

Media Gateway (G/W) 103

The SDU 20 receives data, formats it and then sends it to the G/W 103. Similarly, data received from the G/W 103 can be formatted by the SDU 20.

Signaling Control Connection Part (SCCP) 26

The SCCP 26 is used to provide a referencing mechanism to identify a particular transaction relating to, for instance, a particular call. The current implementation of the A1 interface using TCP/IP protocol employs an SCCP implementation which provides the minimal functionality required to create the CALL context in which to pass IOS messages and monitor the TCP/IP connection. The SCCP 26 is associated with the following functionality:

TCP/IP Connection Establishment

The SCCP creates a TCP/IP socket as a client to communicate with the CA 104.

Signaling Connection Establishment

A new transaction, such as location updating, or an incoming or outgoing call, is initiated on the radio path. Following an Access Request made by the MS on the access channel, the connection establishment is then initiated by the BS.

If the CA 104 decides to perform an inter-CA hard handoff, the connection establishment is initiated by the CA 104.

Signaling Connection Release

This procedure is normally initiated at the CA 104 but in the case of abnormal SCCP connection release, the BS may initiate a connection clearing.

Interoperability System (IOS) 28

The IOS 28 processes messages from the CA 104 or the MCC 22 and converts between internal message format and standard format. A Base Station Application Part (BSAP) is the application layer signaling protocol that provides messaging to accomplish the functions of the A1 Interface component of the CA-BS Interface. The BSAP is split into two sub-application parts: the BS Management Application Part (BSMAP), and the Direct Transfer Application Part (DTAP). The BSMAP supports all Radio Resource Management and Facility Management procedures between the CA 104 and the BS, or to a cell(s) within the BS. BSMAP messages are not passed to the MS, but are used to perform functions at the CA 104 or the BS. A BSMAP message (Complete Layer 3 Information) is also used together with a DTAP message to establish a connection for a MS between the BS and the CA 104, in response to the first layer 3 air interface message sent by the MS to the BS for each MS system request. The DTAP messages are used to transfer call processing and mobility management messages between the CA 104 and BS. DTAP messages carry information that is primarily used by the MS. The BS maps the DTAP messages going to and coming from the CA from/into the appropriate air interface signaling protocol.

The IOS 28 is associated with the following functionality:

Encoding Messages

The IOS messages proprietary format from the MCC 22 as the A interface specifications for sending to the CA.

Decoding Messages

The IOS 28 converts messages from the CA 104 to internal messages.

Packet Control Function (PCF) 24

The PCF 24 is a packet control function to manage the relay of packets between the BS and the PDSN 101. In a cdma2000 wireless network, access to packet data services is provided by the PDSN 101. The PCF 24 provides call processing functionality within the Radio Access Network (RAN) interfaces with the PDSN 101 and interfaces with the MCC 22 and the SDU 20 to provide internal signaling and packet delivery. The interface between the PCF 24 and the MCC 22 is called the A9 interface and the interface between the PCF 24 and the SDU 20 is the A8 interface. The interface between the PDSN 101 and the PCF 24, which is the interface between the radio and packet network, is known as the R-P interface or the A10/A11 interface.

The PCF 24 is associated with the following functionality: Main Processing which creates tasks and receives messages over IP, Message Processing which generates and extracts message by packing and unpacking, A10/A11 Processing which processes the A10/A11 interface, A8/A9 Processing which processes the A8/A9 interface, Hash Processing which performs the MD5 hashing function, Timer Processing which handles timer set, timer cancel, and timeout processing, Utility for primitives and debugging commands, and Call Control for call processing of originating, terminated and handoff calls.

Call Agent Simulator (CA SIM) 30

For wireless voice and data communications, various components, such as the CA 104 in the core network and the IP-BS in the Radio-Access Network, are necessary components. The installation of other components in the core network, such as the CA 104, a HLR, etc., constitutes a large expense. To increase the efficiency and flexibility, a CA-simulator 30 can be provided so that voice and data calls are possible without connecting to the CA 104 or to an HLR. As such, an IP-BS can be installed in a small wireless network without a CA or HLR.

Operation, Administration and Maintenance (OAM) 32

The OAM block 32 is associated with the following functionality: a Configuration Management (CM) block 34 that configures each block or module of the BSC 12 based on program load data (PLD) information (which includes parameters, such as a system ID, an IP address, etc., to configure the system) which can be downloaded from a server, a Status Management (SM) block 36 that obtains a status of the BSC 12 and reports the status to the BSM 99, and a Fault Management (FM) block 38 that checks and detects system faults or alarms and reports them to the BSM.

Referring again to FIG. 1, the radio access network (RAN) 10 further comprises a base transceiver station (BTS) 14. The BTS 14 comprises a Channel Element Control (CEC) 16 coupled to the Radio Call Control (RCC) 18, an Operation, Administration and Maintenance (OAM) 52 block coupled to the CEC, to the RCC, and to a Transmit and Receive Interface (TRX) 40.

The Channel Element Control (CEC) 16

The CEC block 16 controls the call processing to interface with the MS. The CEC also interfaces with upper layer blocks to handle over the air messages to set-up, maintain, and terminate voice and data calls. In order to make these calls, both signaling and traffic frames must be transmitted and received to and from the MS. It is also important for these frames to be transmitted and received at the right time with correct information. This is accomplished by using, for example, a modem chip, such as the Qualcomm CSM5000 modem chip 60, I/F chips 62, a transceiver 64 and a power amplifier 66. The components 60-66 are predominantly hardware components that can be co-located within the RAN 10. The CEC block 16 is associated with the following functionality:

Overhead Channel Configurations

The CEC 16 receives overhead channel configuration messages from the RCM and sets the parameters to the driver of the modem chip 60.

Air Message Encapsulation and Transmission

The CEC 16 encapsulates and sends a frame for sync channel message transmission (at, for example, every 80 msec) and sends a frame for paging channel message transmission (at, for example, every 20 msec). To transmit each frame of the sync and paging channel, the CEC 16 revokes semaphores periodically by external interrupt request source.

CSM Built-in Test

The CEC 16 provides a built-in test function for the modem chip 60 which includes checking a register test, an interrupt test, as well as a reverse ARM test. This test can be performed by an operator's request to show if the modem chip 60 is functioning properly or not.

Forward and Reverse Power Control

The CEC 16 supports forward and reverse power control processing.

Process Time of Day (TOD) Message

The CEC 16 receives the TOD message via a GPS (at, for example, every 2 sec) and processes it to get the system time and GPS status.

Process Loopback Call Procedures

This function supports MS-BTS loop-back call, This function can show if air-interface between MS and BTS works well.

Process Traffic Channel Processing

The CEC 16 is responsible for assigning a traffic channel and clearing it by the order of RCC 18. When the traffic channel is setup, the CEC 16 delivers traffic packets between the SDU 20 and the MS.

Maintain Forward and Reverse Link

The CEC 16 checks the forward and reverse path and reports them to a status or statistics block.

Process High Speed Data Service

The CEC 16 is responsible for processing supplemental channel (SCH) packets for high speed data service which supports up to, for example, 128 kbps. The SCH packets are used if additional channels are needed to handle the transfer of the data.

Process Soft and Softer Handoff procedure

The CEC 16 is responsible for processing Soft and Softer Handoffs.

Provide H/W Characteristics Test Functionalities

The CEC 16 supports various hardware characteristics tests such as an access probe test, a AWGN test, etc. Theses tests determine if the RF or the IF properties of each of the basestations are in order to ensure (via, for example, a good path) that messages can be transferred.

The CSM application 48 is adapted to receive data from the CSM (or modem chip 60) Driver 50.

Radio Call Control (RCC) 18

The call control of the air interface is provided by the RCC 18. The air interface between the MS and the BTS 14 is specified by, for example, the TIA/EIA-95-A/B and the cdma2000 standards, which include the core air interface, minimum performance, and service standards. The functionalities of the RCC 18 consist of call processing, resource management, and supplementary services. The RCC 18 provides call processing functionality in order to setup and release call and resource management of radio resources such as CDMA channels, traffic channel elements, Walsh code channels, frame offsets, etc. The RCC 18 also provides signaling functionality by interfacing with other relevant software blocks.

The RCC 18 provides various processing functions including: Main Processing which creates tasks and receives messages over IP, Resource Management which processes resource allocation and de-allocation, Message Processing which generates and extracts message by packing and unpacking, Initialization Processing which initializes buffers and variables, RCV. from RSCH processing which processes all messages on the reverse common signaling channel, RCV. from RDCH processing which processes some messages on the reverse dedicated signaling channel, RCV. from MCC processing which processes all messages from the MCC, SND. to FSCH processing which processes all messages sent to MS on the forward common signaling channel, SND. to FDCH processing which processes some messages sent to MS and CEC on forward dedicated signaling channel, SND. to MCC processing which processes all messages sent to the MCC, Layer 2 Processing which processes Layer 2 information, Hash Processing which performs the hash function to decide CDMA channel and Paging Channel number, Timer Processing which handles timer set, timer cancel, and timeout processing, and Utility which provides primitives and debugging commands.

Transmit and Receive Interface (TRX) 40

The TRX block 40 controls and diagnoses hardware devices in the BTS 14, and includes:

The PUC/PDC Block 42

The PUC/PDC 42 up-converts and down-converts between a baseband signal and an IF signal.

The Transceiver Control (XCVR) Block 44

The Transceiver Control Block (XCVR) 44 controls transceiver operations which carry IF signals to a carrier frequency band.

AMP Control Block

For high power amplification of the signal, the IP-BS provides the interface to the AMP. The AMP control block controls AMP operations such as ON/OFF.

Hardware Diagnostic Test Module

The diagnostic test module provides the functionalities for hardware characteristics test of pn3383 such as AWGN test, access probe test, etc. For example, the pn3383 test implements test environment conditions.

The power amplifier (PA) 66, via the RRCU 46, amplifies the output signal because the output of the XCVR 44 tends to be small. As such, a broader coverage area is possible.

Operation, Administration and Maintenance (OAM) Block 52

The OAM block 32 is associated with the following functionality: a Configuration Management (CM) block 34 that configures each block or module of the BTS 14 based on program load data (PLD) information (which includes parameters, such as a system ID, an IP address, etc., to configure the system) received from the BSM (or IP-BS) 99, a Status Management (SM) block 36 that obtains a status of the BTS 14 and reports the status to the BSM, and a Fault Management (FM) block 38 that checks and detects system faults or alarms and reports them to the BSM.

Figure 2:
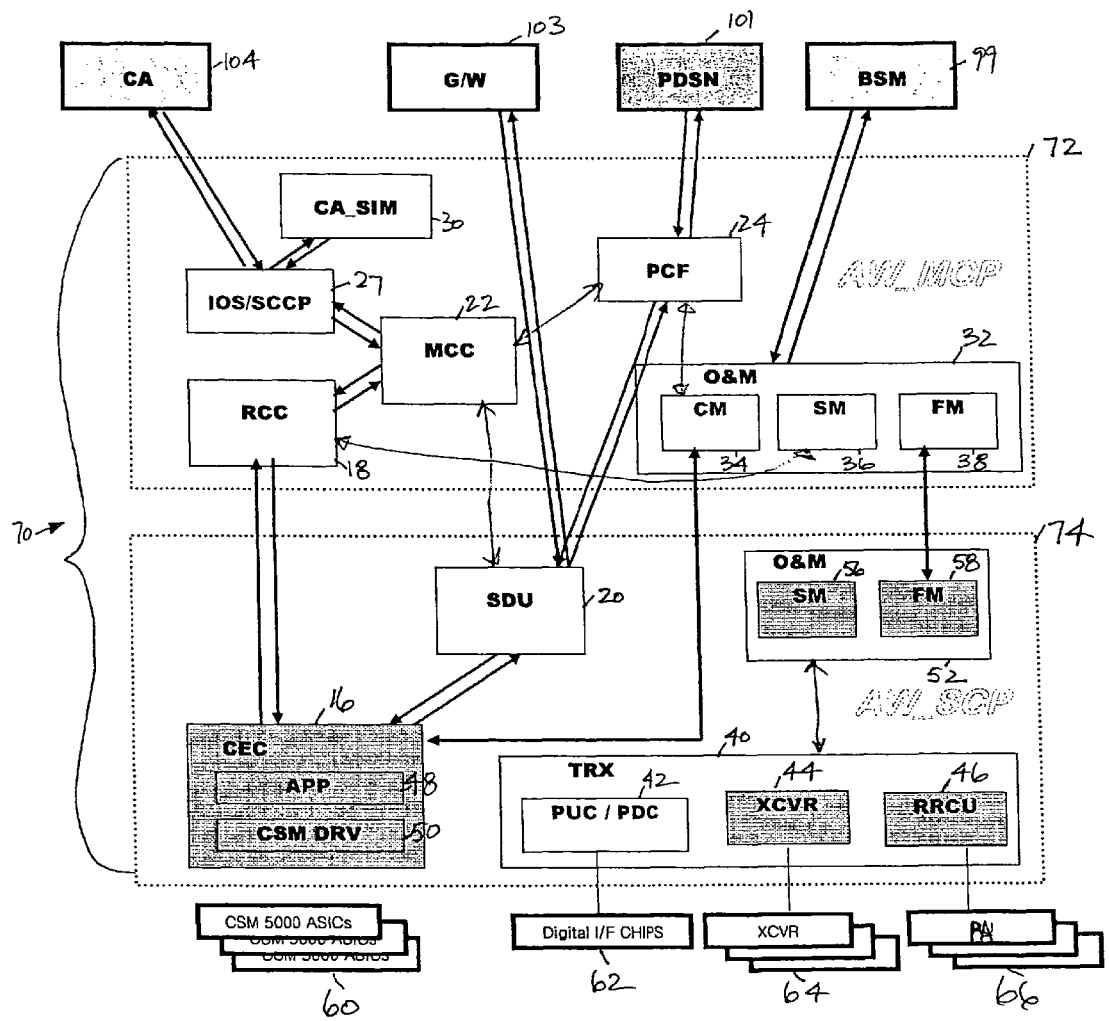
FIG. 2 depicts a stackable RAN in accordance with a preferred embodiment of the present invention.

Referring now to FIG. 2, the components of a stackable IP Radio Access Network (RAN) 70 are depicted. The blocks in the RAN 70 perform a similar functionality to their respective blocks in the RAN 10. Such a stackable RAN 70 provides increased bandwidth and redundancy without utilizing a card based expansion scheme as has been previously employed. Rather, the RAN 70 is modular and stackable (in a very small footprint) and includes a control portion (the Main Control Processor (MCP)) 72 and a device portion (the SDU/CEC Processor (SCP)) 74. With a centralized control portion 72, various device portions 74 can be utilized with a single control portion.

A difference between the RAN 70 and the RAN 10 is that the SDU 20 is now co-located with the CEC 16, and the RCC 18 is co-located with the MCC 22. As such, messaging between these co-located blocks is decreased providing an increase in system performance.

Figure 3:
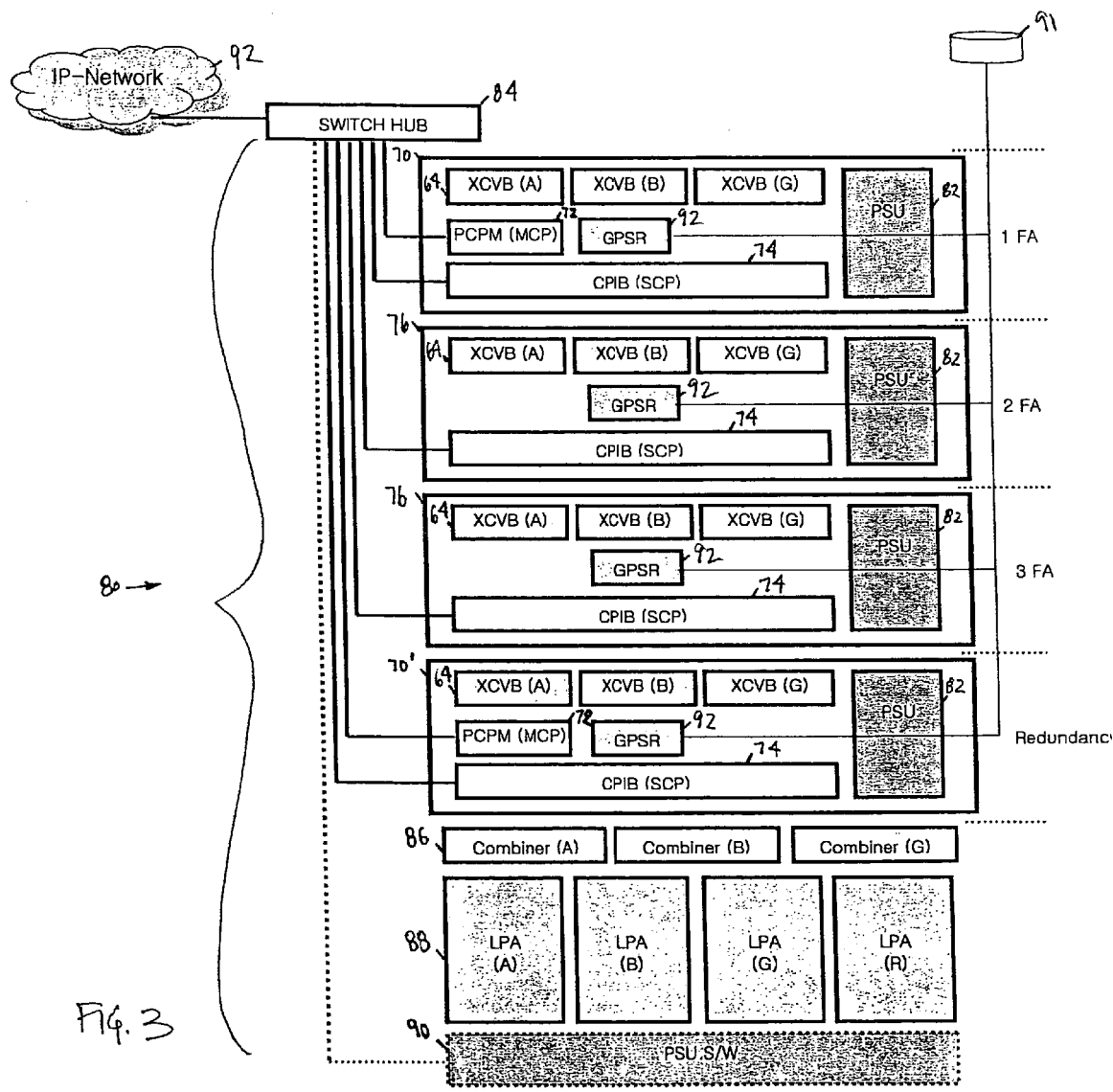
FIG. 3 depicts a further stackable RAN in accordance with a preferred embodiment of the present invention.

Referring now to FIG. 3, a stackable configuration 80 of the RAN of the present invention is depicted. The configuration 80 includes a RAN 70 that includes a master MCP 72 and a RAN 70' that includes a slave MCP 72. The master and slave MCPs preferably have the same IP address for redundancy. If the master MCP fails, a seamless transition to the slave MCP occurs. Backhaul timing is a limited issue because information is transferred between a BTS and a BSC in one "box" and not across a longer distance as with a typical network. The configuration 80 further includes RANs 76 which do not contain an MCP but rather, are controlled by the master MCP 72 in RAN 70. Each of the RANs depicted 70, 70', and 76 include at least one transceiver 64, power supply 82, and GPS receiver 92 that synchronizes the timing between the BSC 12 and the BTS 14 and between the MCP 72 and the SCP 74 per information received from a database 91 and/or GPS related satellites.

The configuration 80 may also include a combiner 86 that may combine a plurality of frequency segments to a common transmission line or antenna, a power amplifier 88 (which is similar to power amplifier 66), and a power supply 90 that could be used to re-set or re-start the RANs 70, 70', and 76. A switch hub 84 may be included to provide a single access (via, for example, an IP address), between the configuration 80 and the IP network 92.

Figure 4:
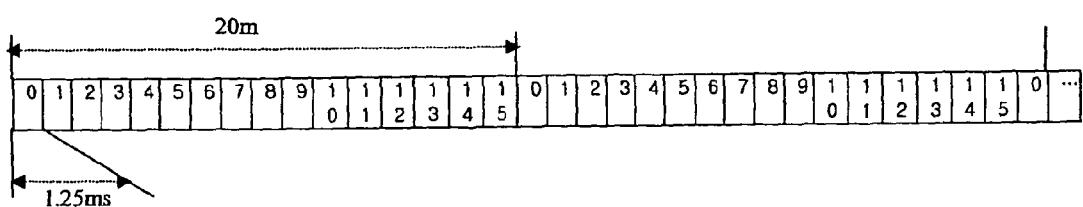
FIG. 4 depicts a frame offset in accordance with a preferred embodiment of the present invention.

FIG. 4 describes an optimized assignment of frame offsets 200. A frame is a basic timing interval. For a sync channel, a frame is 26.667 ms long, while for an access channel, a paging channel, a forward supplemental code channel, and a reverse supplemental code channel, a frame is 20 ms long. For a forward supplemental channel and a reverse supplemental channel, a frame is 20 ms, 40 ms, or 80 ms long, while for an enhanced access channel, a forward common control channel, and a reverse common control channel, a frame is 5 ms, 10 ms, or 20 ms long. For a forward fundamental channel, a forward dedicated control channel, a reverse fundamental channel, and a reverse dedicated control channel, a frame is 5 ms or 20 ms long, while for a common assignment channel, a frame is 5 ms long. For a broadcast control channel, a frame is 40 ms long; the frame may be transmitted once, twice, or four times.

A frame offset is a time skewing of the forward traffic channel or the reverse traffic channel frames from a system time in integer multiples of 1.25 ms. Allocating different frame offset numbers is to avoid access conflict between mobile stations when communicating with a BTS (such as when a BTS is receiving data from the mobile stations).

The frame offset number assigned for call setup is 16 (0 to 15) in a 20 ms frame. It is assumed that a system capacity allows for accepting subscribers at the same time. For an optimized assignment of a frame offset, allocated counts and allocated loads per frame offset are maintained. The allocated count is the number of frame offsets being used and is up to 6.

Since 64 subscribers are possible and the frame offset number assigned for call setup is 16, the allocated count is up to 6 (for load balancing purposes). The allocated load is the number of forward and reverse traffic channel elements assigned to a subscriber using a specified frame offset.

The load for one voice call setup is 2 (1 for the forward channel element and 1 for the reverse channel element). The load for a data service call is 2 (for the first load) and then the load is changeable in terms of the amount of allocated supplemental channels during the traffic state.

Upon initial setup, to optimize the assignment of frame offsets, the lowest load frame offset is assigned. If there are two or more frame offsets which have zero load, the frame offsets are assigned randomly in order to avoid conflict between subscribers in a hand-over state. For example, if a first mobile station was using a frame offset number and a second mobile station using the same frame offset number was being handed-over to the cell in which the first mobile was operating, a conflict would occur between the mobile stations and the load would not be properly balanced. With the frame offsets randomly assigned (instead of sequentially assigned), the load is better balanced because a different frame offset number can be utilized by the second mobile station.

Figure 5:
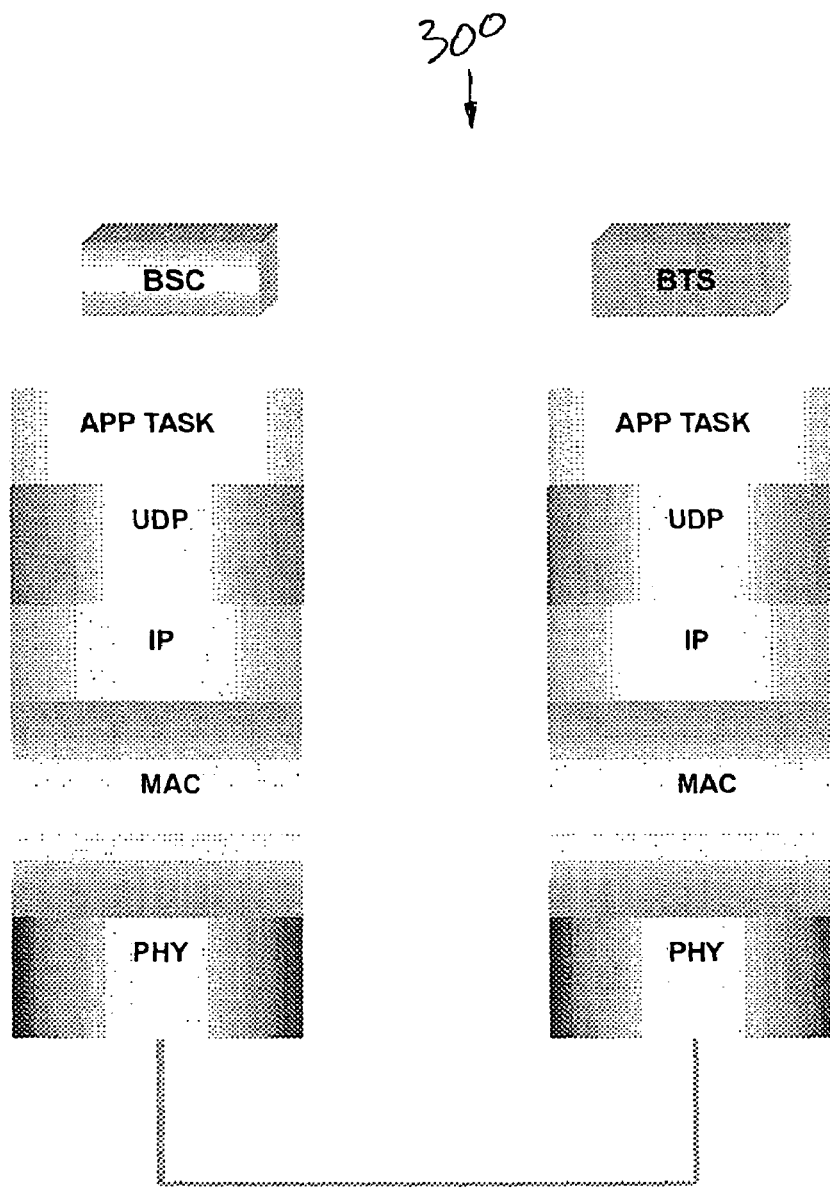
FIG. 5 depicts a prior art TCP/IP stack.

Referring now to FIG. 5, a prior art TCP/IP stack 300 is depicted. Generally, a BSC and a BTS have a TCP/IP stack (supported by an operating system) to communicate with some IP systems. UDP sockets are used to send and receive IP packets. Without any network processor, a bulk of voice packets cannot be processed at the same time because of a CPU overload. The main reason of the overload is related to the TCP/IP network stack. If a certain amount of packets should be passed to the application layer(RX) or to the MAC layer (TX) through the TCP/IP layer, packets will be lost or network resources may be insufficient due to a lack of system performance.

Figure 6:
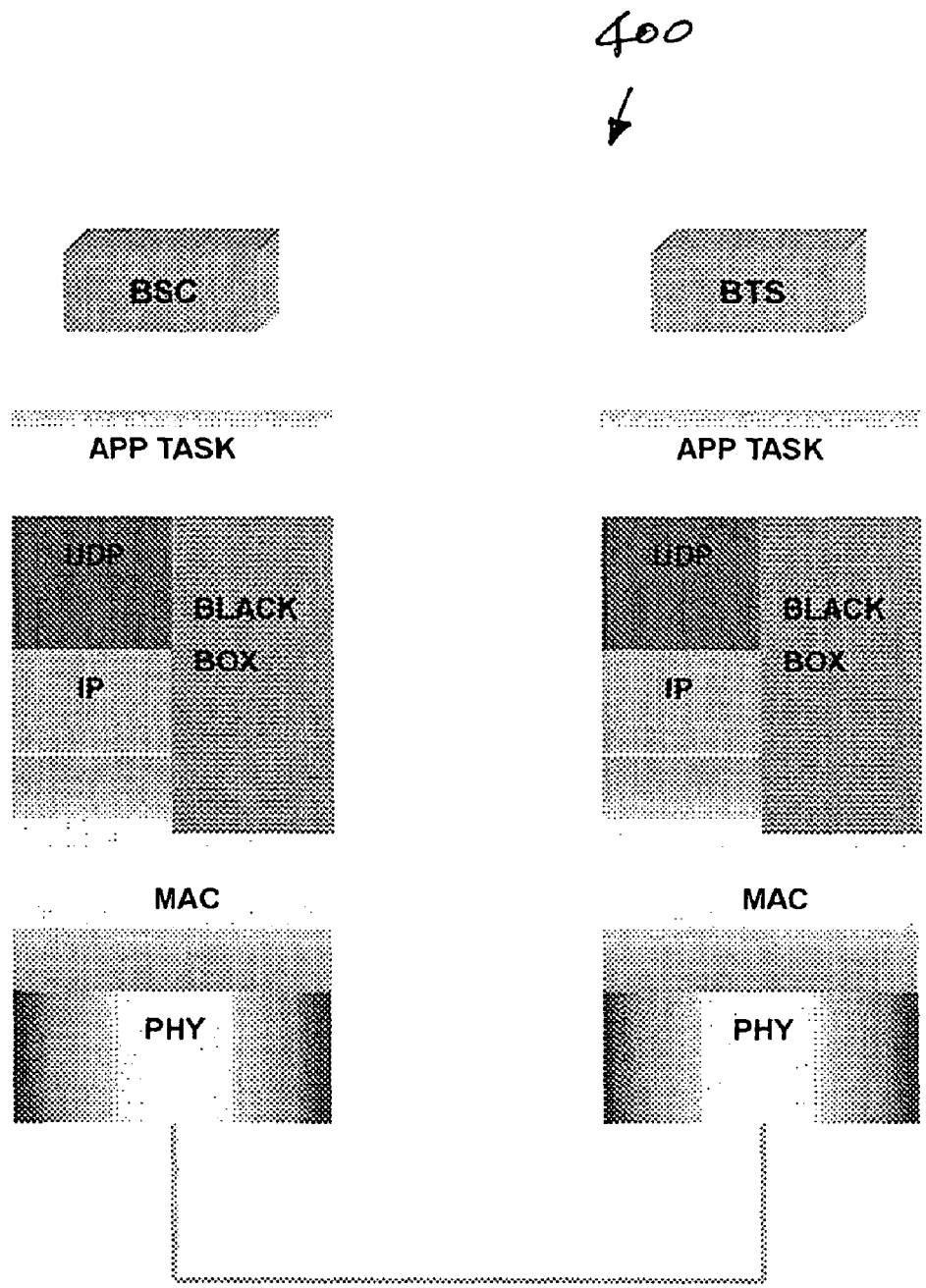
FIG. 6 depicts a UDP/IP stack in accordance with a preferred embodiment of the present invention.

Referring now to FIG. 6, a UDP/IP stack 400, and more specifically, an IP messaging technique for intra-RAN communication, is depicted. Packets, having a known UDP port number, are transferred using an existing UDP/IP stack. Intra-RAN packets for voice and data services are transferred via a UDP/IP stack (the "black box) of the present invention. The black box is much slimmer and lighter than an existing stack and thus a greater number of packets can be processed and transferred. Receive packets are passed directly to an application layer or task (for example from the MAC layer to an SDU 20 or CEC 16) without any complex functions as opposed to the stack 300 in which packets are copied as they proceed through each layer. Even a buffer copy is not made when the MAC layer sends it to the application layer. Transmit packets are sent out via the black box, which attaches the UDP/IP and MAC header values. The MAC address, which is used frequently, is preferably managed separately to avoid Address Resolution Protocol (ARP) broadcasting (which is used to get a MAC address) to save delay time. Even buffer copy is not made when the application layer sends it to the black box.

Referring now to FIG. 7, a session control procedure, and more specifically, a procedure for managing an availability of a call agent in an IP base station is depicted. A base station (BS) should be aware of the status of a call agent (CA) and process current calls in active or process according the status. If a mobile station calls a BS and the CA is inactive, the call is rejected. If the CA is active, however, the BS sends information to the CA to process the call. The following session control procedure is an efficient solution to manage a call agent status in an IP base station (such as a CDMA IP-based base station).

On an initial phase of the BS and the CA, an integer Session ID is acquired to guarantee a return of different Session IDs on two sequential restarts (explained further below). The Session ID is used to check the status between the BS and the CA. On a transport layer setup such as a TCP connection establishment, the BS and the CA will send a Session Initiation message and store the received remote Session ID. This is done so the BS and the CA can compare Session IDs. Until the Session ID is issued, the BS or the CA should not send any application message (as they would be rejected). Both the local and remote Session IDs determine if the new connection is an existing connection (for redundant systems) or, for example, if a cold restart procedure was be performed (which releases all of the existing connections/information between the BS and the CA).

In a redundant configuration, the local Session ID and the remote Session ID should be shared between active and standby processors in the BS and the CA. A timer should be started on failure of the transport layer. If the timer is expired, the remote transport layer is assumed to be unavailable and this will cause the local Session ID to be changed because even if the CA begins operating again, the BS has already released the existing call because the timer expired.

For example, the CA may move from an active state to a standby state (the redundant system) because of a particular situation (such as a memory corruption, a hung system, an operator swapping systems in order to perform maintenance). In such a scenario, a new TCP/IP connection is made by the CA in the now active state (the previous standby CA) with the BS and a Session Initiation message is sent to the BS with the same Session ID. Upon receiving the Session ID, the BS will understand that a "redundant swap" has occurred and continue to process the existing call. If no redundant system existed and the CA were restarted, for example, the BS would clear the existing call.

An example of the Session Initiation message 500 includes a length (5 bytes), a message type (indicating, for example, the Session ID for the BS or the Session ID for the CA), and the Local Session ID (4 bytes). Two sequential IDs should not be the same because if the BS is restarted and the last Session ID was again sent to the CA, the CA would not know a restart had occurred and the integrity of the previous call would be compromised.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the modules RANs 70, 70', and 76, and/or by one or more of the blocks 16-58. Also, these capabilities may be performed in the current manner or in a distributed manner and on, or via, any device able to transfer information between the RANs, the blocks, and/or other components. Further, although depicted in a particular manner, various blocks may be repositioned without departing from the scope of the current invention. For example, the RCC 18 may be positioned in the BSC 12, while the SDU 20 may be positioned in the BTS 14. Still further, although depicted in a particular manner, a greater or lesser number of RANs and/or blocks may be utilized without departing from the scope of the current invention. For example, additional RANs 76 may be utilized in the configuration 80 of the present invention.

What is claimed is:

1. A method for managing an availability of a call agent, comprising:
   acquiring a session identification by a basestation (BS) and a call agent (CA), wherein the BS is coupled to the CA;
   if the CA's state is changed from an active state to a standby state, requesting a new connection with the BS;
   after the new connection is established between the CA and the BS, sending another session identification from the CA to the BS;
   wherein the session identifications include a local session identification and a remote session identification;
   wherein the local session identification and the remote session identification are shared between an active processor and a standby processor in the CA; and
   starting a timer upon failure of a transport layer;
   wherein if the timer expires, changing the local session identification if the BS has already released an existing call.

2. The method of claim 1, wherein the session identification message is the same as the other session identification message.

3. The method of claim 2 comprising:
   continuing to process an existing call by the BS when the other session identification message is received.

4. The method of claim 1, wherein the new connection is established between a redundant CA and the BS.

5. The method of claim 1 wherein the local session identification and the remote session identification are shared between an active processor and a standby processor in the BS.

6. The method of claim 1, wherein the session identification is stored in a session initiation message sent between the BS and the CA.

7. The method of claim 1, wherein the session identification is used to check a status between the BS and the CA.

8. The method of claim 1, wherein the session identification is acquired to guarantee a return of a different session identification on a sequential restart.

9. The method of claim 8, wherein the different session identification alerts the BS or the CA that a new call is to be processed.

10. The method of claim 8, wherein utilizing a just used session identification would allow the BS or the CA to continue processing a previous call.

11. The method of claim 1, wherein until the session identification is issued, the BS should not send any application messages.

12. The method of claim 1, wherein until the session identification is issued, the CA should not send any application messages.

13. The method of claim 6, wherein the session initiation message includes at least one of: a length, a message type, and a local session identification.

14. A system for managing an availability of a call agent, comprising:
   a first module and a second module, wherein the first module is coupled to the second module, wherein the first module and the second module acquire a first identification by;
   if the second module's state is changed, a new connection is requested with the first module;
   after the new connection is established between the second module and the first module, a second session identification is sent from the second module to the first module, wherein the second session identification is equivalent to the first session identification;

wherein the session identifications include a local session identification and a remote session identification;

wherein the local session identification and the remote session identification are shared between an active processor and a standby processor in the CA;

wherein a timer is started upon failure of a transport layer;

wherein if the timer expires, the local session identification is changed if the BS has already released an existing call.

15. A non-transitory computer readable medium comprising instructions for:

acquiring a first identification by a first module and a second module, wherein the first module is coupled to the second module;

if the second module's state is changed, requesting a new connection with the first module;

sending a second session identification from the second module to the first module via the new connection, wherein the second session identification is equivalent to the first session identification;

wherein the session identifications include a local session identification and a remote session identification;

wherein the local session identification and the remote session identification are shared between an active processor and a standby processor in the CA; and starting a timer upon failure of a transport layer;

wherein if the timer expires, changing the local session identification if the BS has already released an existing call.

* * * * *